(12) United States Patent
Weber

(10) Patent No.: US 8,967,667 B2
(45) Date of Patent: Mar. 3, 2015

(54) MODULAR SUPPORTING DEVICE FOR A SEMI-TRAILER AND SEMI-TRAILER HAVING SUCH SUPPORTING DEVICE

(75) Inventor: Elmar Weber, Dülmen (DE)

(73) Assignee: Saf-Holland GmbH, Bessenbach (DE)

( * ) Notice: Subject to any disclaimer, the term of this patent is extended or adjusted under 35 U.S.C. 154(b) by 0 days.

(21) Appl. No.: 13/590,684

(22) Filed: Aug. 21, 2012

(65) Prior Publication Data

US 2013/0213162 A1    Aug. 22, 2013

(30) Foreign Application Priority Data

Aug. 24, 2011    (DE) .................. 10 2011 081 455

(51) Int. Cl.
*B60S 9/08*    (2006.01)
*B62D 63/08*    (2006.01)

(52) U.S. Cl.
CPC .. *B62D 63/08* (2013.01); *B60S 9/08* (2013.01)
USPC ..................... 280/766.1; 280/763.1; 254/418; 254/419; 254/424; 254/425

(58) Field of Classification Search
USPC ............. 280/762, 763.1, 764.1, 765.1, 766.1, 280/254, 419, 420, 424, 425, 427; 254/418, 254/419, 420, 424, 425, 427
See application file for complete search history.

(56) References Cited

U.S. PATENT DOCUMENTS

| | | | |
|---|---|---|---|
| 2,232,187 A | 2/1947 | Reid | |
| 3,182,956 A | 5/1965 | Dalton | |
| 3,632,086 A * | 1/1972 | Mai | ................. 254/419 |
| 3,861,648 A | 1/1975 | Glassmeyer | |
| 5,199,738 A * | 4/1993 | VanDenberg | ............. 280/766.1 |
| 5,542,647 A | 8/1996 | Huetsch | |
| 5,904,342 A * | 5/1999 | Laarman | ....................... 254/419 |
| 6,623,035 B1 * | 9/2003 | Schneider | ................. 280/766.1 |
| 8,051,545 B2 | 11/2011 | Peveler | |
| 2003/0183033 A1 | 10/2003 | Peveler | |

FOREIGN PATENT DOCUMENTS

DE    20200601247 U1    12/2006
DE    10 2006 012 472    9/2007

* cited by examiner

*Primary Examiner* — Hau Phan
*Assistant Examiner* — Bryan Evans
(74) *Attorney, Agent, or Firm* — Price Heneveld LLP

(57) ABSTRACT

The invention relates to a supporting device for a semi-trailer or the like, comprising an outer supporting tube and an inner supporting tube, wherein the inner supporting tube is telescopically arranged in the outer supporting tube and may be moved in the axial direction relative to the outer supporting tube by a spindle mechanism mounted inside the outer supporting tube. The supporting device may further comprise an actuating device for actuating the spindle mechanism, which is configured as a separate structural unit and arranged outside of the outer supporting tube. The invention further relates to a semi-trailer having at least one such supporting device as well as an actuating device and a transmission device for use in such a supporting device.

16 Claims, 2 Drawing Sheets

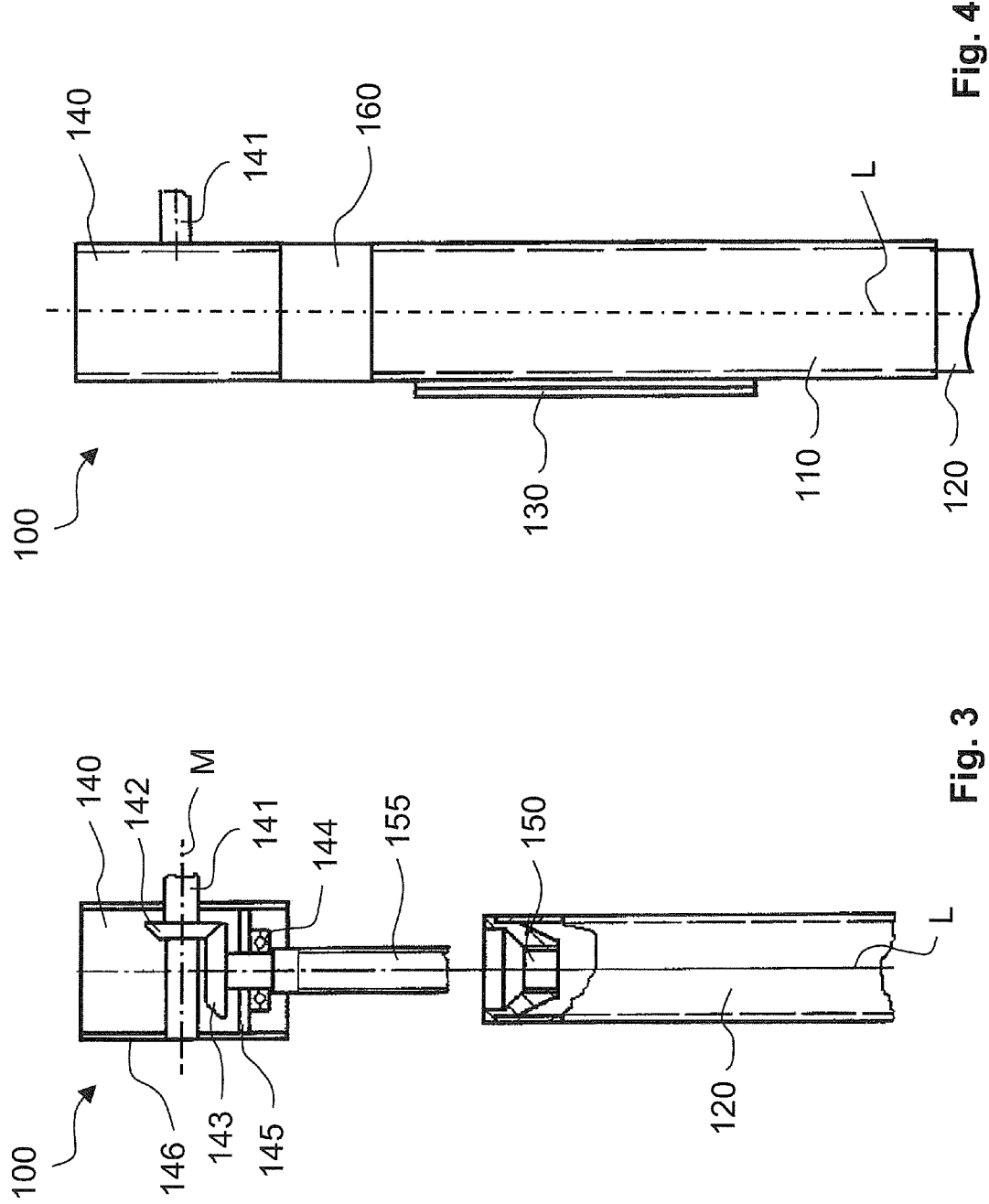

MODULAR SUPPORTING DEVICE FOR A SEMI-TRAILER AND SEMI-TRAILER HAVING SUCH SUPPORTING DEVICE

BACKGROUND OF THE INVENTION

The invention relates to a supporting device or landing gear for a semi-trailer or the like, a semi-trailer having at least one such supporting device as well as an actuating device and a transmission device for use in such a supporting device.

A supporting device of the type in question serves for supporting a semi-trailer when said semi-trailer is decoupled from the road tractor, wherein in most cases two supporting devices (pair of supports) are used per semi-trailer. Such a supporting device is known from DE 20 2006 012 472 U1, for example. The supporting device known from this document comprises an outer supporting tube and an inner supporting tube, wherein the inner supporting tube is telescopically arranged within the outer supporting tube and may be moved in the axial direction relative to the outer supporting tube by means of a spindle mechanism mounted inside (i.e. within the tube). The spindle mechanism is actuated by means of an actuating device arranged within the outer supporting tube, which makes it possible to convert a rotational movement generated by a hand crank or the like into a rotational movement of the spindle.

A disadvantage of the known supporting device is that the constructional outlay is substantial, in particular since it is often necessary to individually adapt the supporting device to the respective semi-trailer.

Therefore, an object underlying the present invention is to provide a supporting device or landing gear of the type mentioned in the introductory portion, which may be manufactured with small constructional outlay.

SUMMARY OF THE INVENTION

The supporting device according to the invention comprises a straight outer supporting tube and a straight inner supporting tube, wherein the inner supporting tube is telescopically arranged in the outer supporting tube and may be moved in the axial direction relative to the outer supporting tube by means of a spindle mechanism mounted inside. The supporting device according to the invention further comprises an actuating device for actuating the spindle mechanism, which is configured as a separate structural unit and arranged outside of the outer supporting tube.

The basic idea of the invention is to no longer arrange the actuating device for actuating the spindle mechanism inside of the outer supporting tube, which inherently involves a certain constructional outlay, but as a separate structural unit or as a separate building block or building module. Thus, the supporting device according to the invention has a modular structure. The actuating device for actuating the spindle mechanism, which is configured as a separate structural unit, (hereinafter simply referred to as actuating device) preferably has a housing of its own. When manufacturing a supporting device according to the invention, it is possible to individually cut or dimension the lengths of the outer supporting tube and of the inner supporting tube. Thereafter, it is possible to combine or assemble the inner supporting tube, the outer supporting tube, the spindle mechanism (or its individual components) and the separate actuating device for the spindle mechanism with relatively small effort.

The invention makes it further possible to create a few-component modular construction system, by means of which supporting devices according to the invention may be assembled flexibly and tailored to the customer's needs. Said modular construction system may comprise e.g. outer supporting tubes and inner supporting tubes provided as bulk goods (in particular having a rectangular cross-section), spindles in various lengths (and/or spindles which may be cut to length) and actuating devices for actuating the spindle mechanism, which are configured as separate structural units, wherein there may be comprised different constructional types of such actuating devices (with or without a multi-speed step-up gear unit, for example, as will be explained in more detail hereinafter). The specific combination of said components makes it possible to manufacture a great variety of supporting devices according to the invention.

The actuating device for actuating the spindle mechanism, which is configured as a separate structural unit, may be connected to the outer supporting tube. Preferably, the actuating device for the spindle mechanism, which is configured as a separate structural unit, is directly attached at the upper end face or at an upper portion of the outer supporting tube, e.g. flanged thereto. The upper end face is the end face opposite the bottom end face, from which the telescopic inner supporting tube protrudes. The actuating device may be bolted/screwed, welded, riveted and/or crimped to the outer supporting tube. Crimping means a connection provided by means of plastic deformation. In addition, there may be provided positive-locking elements such as intermeshing teeth. A connection between the actuating device and the outer supporting tube may also be provided by means of a mounting plate arranged on the outer supporting tube (in order to attach the supporting device according to the invention at the semi-trailer). Said mounting plate may protrude beyond the upper side or end face of the outer supporting tube. Said exceeding or protruding portion of the mounting plate will then serve as a fastening portion, where the actuating device may be fixed. Furthermore, between the outer supporting tube and the actuating device there may be arranged an intermediate piece (e.g. a distance or spacer tube).

Preferably, the actuating device for actuating the spindle mechanism, which is configured as a separate structural unit, comprises at least one input shaft for a hand crank and/or a drive motor as well as a conversion gear mechanism, such as in particular a bevel gearing, which converts or transforms a rotational movement on the input shaft into a rotational movement of the spindle.

The actuating device for actuating the spindle mechanism, which is configured as a separate structural unit, may comprise a shiftable multi-speed step-up gear unit. Such a shiftable multi-speed step-up gear unit provides e.g. a so-called fast or high gear and a so-called low gear; in this context, reference is made to DE 20 2006 012 472 U1.

Particularly preferably, the supporting device according to the invention further comprises a transmission device having a shiftable multi-speed step-up gear unit, which is configured as a separate structural unit and flanged to the separately configured actuating device. Preferably, said transmission device is arranged between the separately configured actuating device and the outer supporting tube. Preferably, such a transmission device, which is configured as a separate structural unit, comprises a housing of its own. In particular, the actuating device, which is configured as a separate structural unit, and the step-up gear unit, which is configured as a separate structural unit, are directly flanged to one another via their respective housings. The connection may be provided by means of bolting/screwing, welding, riveting and/or crimping. In addition, there may be used positive-locking elements such as intermeshing teeth.

The spindle mechanism of the supporting device according to the invention comprises a spindle, which is inserted or plugged into the actuating device configured as a separate structural unit or into the transmission device configured as a separate structural unit preferably from the bottom, and is supported in the axial and/or in the radial direction by at least one rolling contact bearing (which belongs to the actuating device or the transmission device) arranged there.

BRIEF DESCRIPTION OF THE DRAWINGS

The invention will be described hereinbelow in greater detail by way of example an in a non-limiting manner with reference to the Figures.

FIG. 3 shows a schematic cross-sectional view of the supporting device of FIG. 1.

FIG. 4 shows a side view of a further embodiment of a supporting device according to the invention.

DETAILED DESCRIPTION OF THE PREFERRED EMBODIMENTS

Figure 1:
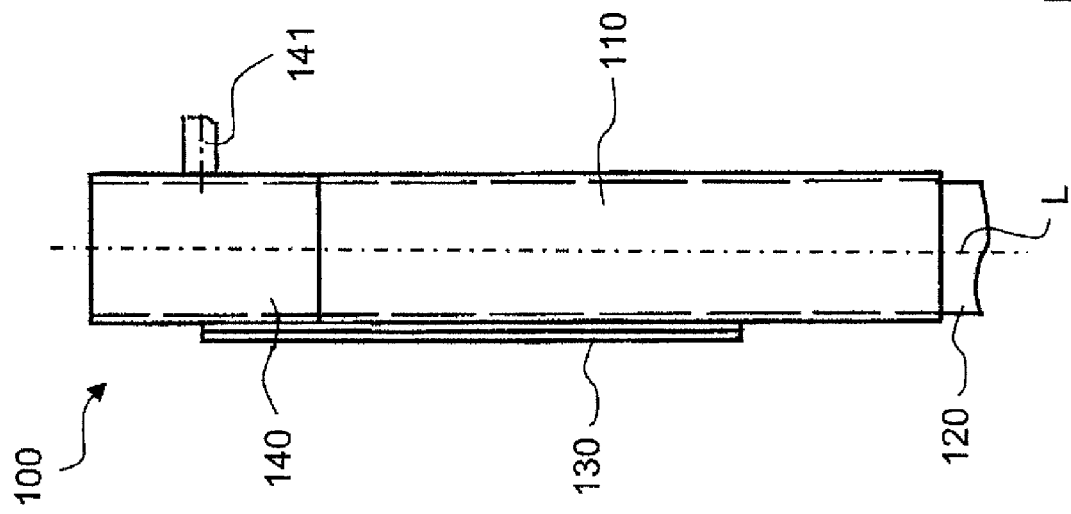
FIG. 1 shows a front view of a supporting device according to the invention.
Figure 2:
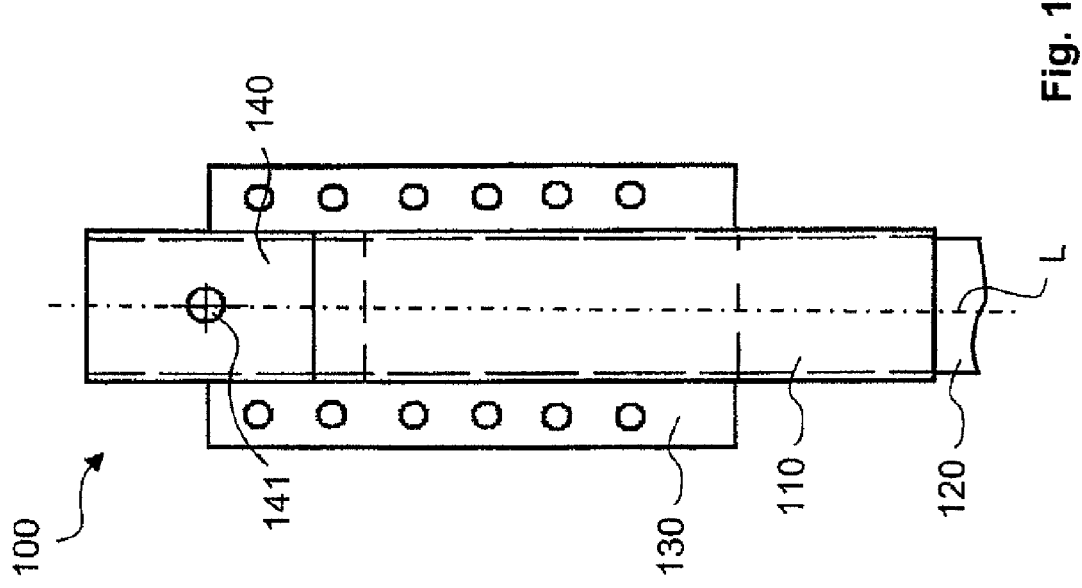
FIG. 2 shows a side view of the supporting device of FIG. 1.

FIGS. 1 and 2 show a supporting device 100 according to the invention for a semi-trailer or the like. The supporting device 100 comprises an outer supporting tube 110, in which an inner supporting tube 120 is arranged telescopically or in such a manner that it it slidable in the longitudinal direction and which protrudes at the bottom end face out of the outer supporting tube 110. The outer supporting tube 110 and the inner supporting tube 120 have square cross-sections. At the bottom end of the inner supporting tube 120 there is attached a supporting foot or compensating foot (not shown). Reference numeral 130 designates a mounting plate or a screw-on plate, by means of which the supporting device 100 may be bolted/screwed to the frame of a semi-trailer. The mounting plate 130 is welded to the outer supporting tube 110, for example.

In order to move the inner supporting tube 120 along the longitudinal axis L relative to the outer supporting tube 110, there is provided a spindle mechanism inside, as will be explained in more detail hereinafter in connection with FIG. 3. In order to actuate said spindle mechanism, there is provided an actuating device 140, which is configured as a separate structural unit and flanged directly to the upper end face of the outer supporting tube 110 such that it is axially aligned with and firmly connected to the outer supporting tube 110. Preferably, said actuating device 140 is provided as a ready-to-install structural unit or component, which may already be painted, for example. To this end, the actuating device 140 may have a housing of its own.

FIG. 3 shows the function of the spindle mechanism and the structure of the actuating device 140 for actuating said spindle mechanism. The outer supporting tube 110 is not shown. The spindle mechanism comprises a spindle nut 150, which is arranged fixedly or floatingly at the upper axial end in the inner supporting tube 120, and a spindle 155 (with a trapezoidal thread, for example), which engages the spindle nut 150 (the engagement is not shown) and which at its upper axial end is attached at the actuating device 140. It is possible, in a known manner, to move the inner supporting tube 120 along the longitudinal axis L relative to the outer supporting tube 110 by rotating the spindle 155 (around the longitudinal axis L). Depending on the direction of rotation, the inner supporting tube 120 is retracted into the outer supporting tube 110 or extended out of the outer supporting tube 110.

The actuating device 140 comprises an input shaft 141 for a hand crank or a drive motor. The longitudinal axis or axis of rotation M of the input shaft 141 extends perpendicular to the longitudinal axis or axis of rotation L of the spindle 155. On the input shaft 141 there is arranged in a torque-proof or non-rotatable manner a first bevel gear 142, the teeth of which engage a second bevel gear 143, wherein the second bevel gear 143 is connected to the spindle 155 in a torque-proof or non-rotatable manner. The first (driving) bevel gear 142 and the second (driven) bevel gear 143 form a bevel gearing, which converts a rotational movement on the input shaft 141 into a rotational movement of the spindle 155.

The spindle 155 is inserted from the bottom into the actuating device 140 and directly or indirectly connected to the second bevel gear 143 in a torque-proof or non-rotatable manner. In order to support the upper axial end of the spindle 155 axially and/or radially, there is provided a rolling contact bearing 144. Thus, the upper spindle support is integrated into the actuating device 140. Reference numerals 145 and 146 designate a support or carrier plate and a housing or shell, respectively. The actuating device 140 may comprises an integrated shiftable multi-speed step-up gear unit, as has been explained above.

FIG. 4 shows an alternative embodiment of a supporting device according to the invention having a transmission device 160 with a shiftable multi-speed step-up gear unit (cf. the respective explanations above). The transmission device 160 is also configured as a separate structural unit and embedded between the separately configured actuating device 140 and the outer supporting tube 110 in such a manner that it is aligned. As an alternative to the embodiment shown, the transmission device 160 might also be flanged laterally to the actuating device 140, for example.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A supporting device for a semi-trailer, comprising:
   an outer supporting tube defining an outer planform area and an inner supporting tube, wherein the inner supporting tube is telescopically arranged in the outer supporting tube and is shiftable in an axial direction of the inner supporting tube relative to the outer supporting tube by a spindle mechanism mounted inside the outer supporting tube;
   an actuating device that actuates the spindle mechanism, wherein the actuating device is configured as a separate structural unit and arranged outside of the outer supporting tube, and wherein a majority of the actuating device is vertically positioned above and within the outer planform area of the outer supporting tube, and wherein the actuating device includes a housing; and
   a mounting plate configured to attach the supporting device at the semi-trailer and that protrudes beyond an upper side of the outer supporting tube, wherein a portion of the mounting plate that protrudes beyond the upper side of the outer supporting tube is configured as a fastening portion for fixing the housing of actuation device on the outer supporting tube.

2. The supporting device of claim 1, wherein the actuating device for actuating the spindle mechanism is arranged directly at an upper end face of the outer supporting tube.

3. The supporting device of claim 2, wherein the actuating device for actuating the spindle mechanism is at least one of a screwed, bolted, welded, riveted and crimped to the outer supporting tube.

4. The supporting device of claim 3, wherein the actuating device for actuating the spindle mechanism comprises an input shaft for at least one of a hand crank and a drive motor, and a bevel gearing that converts a rotation on the input shaft into a rotation of the spindle.

5. The supporting device of claim 4, wherein the actuating device for actuating the spindle mechanism further comprises a shiftable multi-speed step-up gear unit.

6. The supporting device of claim 5, wherein the supporting device further comprises a transmission device with a shiftable multi-speed step-up gear unit configured as a separate structural unit and to which the separately configured actuating device is flanged.

7. The supporting device of claim 6, wherein a spindle of the spindle mechanism is at least one of inserted from bottom into the actuating device and into the transmission device, and further wherein the spindle supported by at least one rolling contact bearing.

8. The supporting device of claim 1, wherein the actuating device for actuating the spindle mechanism is at least one of a screwed, bolted, welded, riveted and crimped to the outer supporting tube.

9. The supporting device of claim 1, wherein the actuating device for actuating the spindle mechanism comprises an input shaft for at least one of a hand crank and a drive motor, and a bevel gearing that converts a rotation on the input shaft into a rotation of the spindle.

10. The supporting device of claim 1, wherein the actuating device for actuating the spindle mechanism further comprises a shiftable multi-speed step-up gear unit.

11. The supporting device of claim 1, wherein the supporting device further comprises a transmission device with a shiftable multi-speed step-up gear unit configured as a separate structural unit and to which the separately configured actuating device is flanged.

12. The supporting device of claim 1, wherein a spindle of the spindle mechanism is at least one of inserted from bottom into the actuating device and into the transmission device, and further wherein the spindle supported by at least one rolling contact bearing.

13. A semi-trailer, comprising at least one supporting device according to claim 1.

14. An actuating device for a spindle mechanism for use in a supporting device according to claim 1, wherein the actuating device is configured as a separate structural unit.

15. A transmission device with a shiftable multi-speed step-up gear unit for use in a supporting device according to claim 1, wherein the actuating device is configured as a separate structural unit.

16. A supporting device for a semi-trailer, comprising:
- an outer supporting tube defining an outer planform area and an inner supporting tube, wherein the inner supporting tube is telescopically arranged in the outer supporting tube and is shiftable in an axial direction of the inner supporting tube relative to the outer supporting tube by a spindle mechanism mounted inside the outer supporting tube; and
- an actuating device that actuates the spindle mechanism, wherein the actuating device is configured as a separate structural unit and arranged outside of the outer supporting tube, and wherein at least a portion of the actuating device is positioned within the outer planform area of the outer supporting tube and above an uppermost edge of the outer supporting tube, and wherein the actuating device includes a housing; and
- a mounting plate configured to attach the supporting device at the semi-trailer and that protrudes beyond an upper side of the outer supporting tube, wherein a portion of the mounting plate that protrudes beyond the upper side of the outer supporting tube is configured as a fastening portion for fixing the housing of the actuation device on the outer supporting tube.

* * * * *